(12) United States Patent
Bain

(10) Patent No.: US 11,300,994 B2
(45) Date of Patent: Apr. 12, 2022

(54) ALL-IN-ONE COMPUTER SYSTEM

(71) Applicant: Norial Prince Bain, Seattle, WA (US)

(72) Inventor: Norial Prince Bain, Seattle, WA (US)

( * ) Notice: Subject to any disclaimer, the term of this patent is extended or adjusted under 35 U.S.C. 154(b) by 30 days.

(21) Appl. No.: 16/043,729

(22) Filed: Jul. 24, 2018

(65) Prior Publication Data
US 2020/0319668 A1 Oct. 8, 2020

(51) Int. Cl.
G06F 1/00 (2006.01)
G06F 1/16 (2006.01)
G06F 1/18 (2006.01)
G06F 9/4401 (2018.01)
H04L 29/06 (2006.01)
H04L 12/46 (2006.01)
H04L 41/12 (2022.01)
H04N 1/00 (2006.01)
G06F 9/445 (2018.01)
H04W 84/12 (2009.01)

(52) U.S. Cl.
CPC ............ *G06F 1/1601* (2013.01); *G06F 1/182* (2013.01); *G06F 9/442* (2013.01); *G06F 9/445* (2013.01); *H04L 12/4641* (2013.01); *H04L 41/12* (2013.01); *H04L 63/0428* (2013.01); *H04L 63/061* (2013.01); *H04N 1/00384* (2013.01); *H04N 1/00557* (2013.01); *H04W 84/12* (2013.01)

(58) Field of Classification Search
CPC ........ G06F 1/1601; G06F 1/182; G06F 9/442; G06F 9/445; H04L 12/4641; H04L 41/12; H04L 63/0428; H04L 63/061; H04N 1/00384; H04N 1/00557; H04W 84/12
See application file for complete search history.

(56) References Cited

U.S. PATENT DOCUMENTS

| | | | |
|---|---|---|---|
| 2005/0047107 A1* | 3/2005 | Pan | G06F 1/18 361/807 |
| 2005/0284997 A1* | 12/2005 | Tisbo | F16M 13/022 248/276.1 |
| 2006/0077426 A1* | 4/2006 | Lovat | H04L 67/02 358/1.15 |
| 2013/0176672 A1* | 7/2013 | Richard | G06F 1/1616 361/679.22 |
| 2014/0159896 A1* | 6/2014 | Shapiro | G08B 25/14 340/539.16 |
| 2015/0280916 A1* | 10/2015 | Bjarnason | H04L 9/3213 726/1 |
| 2017/0054857 A1* | 2/2017 | Lea | H04N 1/00129 |
| 2018/0234501 A1* | 8/2018 | Colston | H04L 12/28 |

* cited by examiner

*Primary Examiner* — Khai M Nguyen
(74) *Attorney, Agent, or Firm* — Cygnet IP Law, P.A.; Stephen W. Aycock, II

(57) ABSTRACT

Some implementations can include an all-in-one computer system and associated methods.

17 Claims, 14 Drawing Sheets

ALL-IN-ONE COMPUTER SYSTEM

FIELD

Some implementations relate to computer systems, and in particular, to an all-in-one computer system having a central processing unit (CPU), display device, scanner, and/or other components.

BACKGROUND

Traditionally, the CPU and computer display (e.g., a computer monitor) are often manufactured as separate components. Over time, computer resources may become obsolete or inadequate in performing computing functions. The customary industry build of servers, desktops, and other similar devices may not allow for the flexible physical movement (e.g., angle, orientation, etc.) of computers.

A need may exist for a fully functional all-in-one computer having a capability of swiveling on its axes.

Current industry practice may not permit computers to connect to other computers on the same domain network where only an internet connection is present on each device.

Third-party file encryption software or encrypted connections are predominantly used to securely exchange information, which has a limitation of causing dependency on third-party software.

Presently, when computer resources (i.e. hard drive storage, RAM, etc.) prove inadequate, the resource is either modified or changed for a newer version. As a result, this expense can potentially balloon and exhaustive computer downtime may be experienced.

Servers and desktops may be primarily designed to be powered solely by a power cord and, consequently, are not easily transported.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations include unifying of these items into one casing that encourages an ergonomically friendly environment. Secondly, some implementations can provide a secure connection between computers that permits users access from one device to another and is currently possible when the machines are joined to the same domain network. Some implementations can provide such connections depending on device configuration as edited by the appropriate user(s) and providing the computers are connected to the Internet. This eliminates the requirement for them to be attached to the same domain network.

Concern for enhanced file transfer security between computers is addressed by the previous feature in combination with the automation of compressing files to be exchanged, giving the option of encrypting all or specific compressed files, and requiring user acceptance of files. When acceptance has been triggered, the matching key on the receiving device is verified before file download commences.

The capability of sharing resources (i.e. hard drive storage, RAM, processor speed, power supply, etc.) extends a devices life and allows for processes to run faster and more efficiently. Additionally, the systems of connected computers can be conveniently compared which allows users to quickly pinpoint any internal environmental differences and receive recommendations on how to equalize the systems.

Ease of portability for all computer types (e.g., servers and desktops) is made available by implementing the use of rechargeable batteries for all computing devices.

However, this invention incorporates a swivel mechanism that allows the computer to rotate on its stand. Consequently, the display window can rotate to portrait or landscape mode and the computer frame itself can also function as a scanner due to the swiveling capability.

However, this invention eliminates primary dependency on such third-party software and implements this feature that is enabled by default or can be disabled by users to affect all files or specific files. This built-in mechanism also works in conjunction with the display sync feature.

A part of the described invention's capabilities is that the sync feature enables the resources of one computer to be seamlessly shared with another, immediately improving the performance of the impacted computer.

Due to the inclusion of rechargeable batteries for these computer types in this invention, they will now be easily portable.

Finally, the active display window possessing the capability of rotating to portrait or landscape format or the computer also serving as a scanner are not problems per se. They are merely functional enhancements to computers beyond their existing standard functionality.

DETAILED DESCRIPTION

Figure 1:
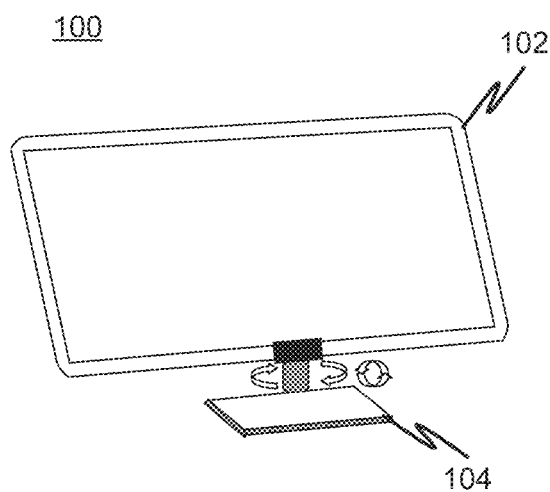
FIG. 1 is a diagram of an example all-in-one computer system showing degrees of motion in accordance with some implementations.

The systems and methods provided herein may overcome one or more deficiencies of some conventional computer systems. For example, in some implementations, an All-in-One (AiO) computer can be designed in the form of a computer monitor. Standard and non-standard computer components include but are not limited to an operating system, wireless adapter, power cord, computing ports and drives (i.e. USB, HDMI, audio/microphone jack, Ethernet, CD/DVD, display card, other card readers, etc.), webcam, Bluetooth, speakers, and other types of hardware and software elements. An AiO can be applicable to various computer types including, but not limited to, a server, desktop, laptop, or other portable/non-portable device.

Some implementations can include a capability to revolve on its frame and having its height adjusted while maintaining its display capability from a myriad of viewing angles.

Some implementations provide a capability of connecting the AiO systems to each other wirelessly or otherwise via internal commands that automatically create a secure virtual network. This connectivity permits the AiO computers to maintain individual displays of items or sync with each other and/or render an identical visual across the connected computers.

Additionally, some implementations include a sync feature that permits files and specific computer resources (e.g. hard drive storage, RAM, processor speed, power supply, etc.) to be shared securely. A temporary or permanent increase in computing performance can be obtained and the need to often replace underperforming computers can be reduced.

AiO computers can include a capability to perform real-time system compatibility checks to be used in comparison to other similar computer systems. This specific feature can help facilitate awareness of system configurations and be used for troubleshooting purposes. Such a check can include installed programs, background service applications and their state, operating system type/version, system resources currently in use and their performance, and other hardware and software factors that comprise the computer environment. Automatic recommendations to equalize the compared systems can be generated.

In some implementations, portability can be enhanced by providing the AiO computer systems, regardless of type (i.e. server, desktop, or other portable/non-portable device), with a rechargeable battery that allows for ease of transportation without having to power off the computer. Built-in functionality makes it possible for data to be manually or automatically backed up directly between synced devices by way of an encrypted medium, thus, reducing or eliminating reliance on third party applications for this process.

Some implementations are made further adroit by being mounted on a swivel stand enabling them to be rotated in any direction on both the horizontal and vertical axes. Consequently, the active display window will rotate to portrait or landscape format in accordance to the swivel direction of the computer. The capability of swiveling on the horizontal axis permits the device to also serve as a scanner, eliminating the need to purchase a separate device to perform this task.

Some implementations can include a remote control that accompanies the AiO and controls functionalities related to aspects of its usage. The remote control can provide another layer of novelty to this non-provisional patent application by way of the computer boot sequence or shutdown sequence being initiated by the remote control. Additionally, powering on or off the display only, setting the computer/display audio volume and configuration, setting the computer/display picture quality and configuration, enabling or disabling the wireless internet connectivity, activating the scan and copy mechanisms, cycling through the display menu, and the implementation of other such features add to the breadth of this invention.

The remote control can include technologies such as radio frequency to ensure that no line of sight is needed for the remote to work with the AiO computer device and a motion sensor(s) allow for the button pad to be automatically backlit when moved, in addition to affecting other behaviors. Moreover, voice control can permit the device commands to be audibly given and Bluetooth connectivity ensures that other Bluetooth devices can be paired to and controlled by this remote.

In some implementations, the computer volume and the display volume can be allowed to operate independently from each other. The CPU volume can be set to adjust synchronously with the display volume (default setting) or set to be adjusted independently.

In some implementations, the AiO computer/display unit is detachable from the swivel stand, thus, serving as a wall mountable unit. While wall-mounted, the AiO still serves the purpose of a computing device or solely as a display device.

Some implementations of the AiO computer system can include a built-in automatic document feeder and scanner. Documents and flat oddly shaped paper items can be scanned and saved as files on the computer or copied and printed to any local or network printer configured on the computer. Pages are entered through the feeder's opening and pass through to its opposite end (or reversed through the feeder's entrance) while being scanned or copied. Depending on the computer model, one-sided or duplex scanning in addition to single or multiple paper entries is supported. The scan head can be immobile to decrease malfunction and further support the automated movement of the documents. Some implementations can include an electronically retractable document tray (e.g., 202) that assists with the process of feeding documents into the feeder. It can be located underneath the opening and extends whenever the feeder is operational.

Some implementations can include a controllable swivel point, such as in the form of a cylindrical rod, sphere, or other swivel type coupled between a fixed location on the device stand and the computer housing.

FIG. 1 is a diagram of an example all-in-one (AiO) computer system environment 100 showing degrees of motion in accordance with some implementations. The environment 100 includes an AiO computer system 102 and a stand 104. The AiO system 102 includes the integrated electronics (e.g., including display, processor, data storage, and scanner) and a stand 104.

Figure 2:
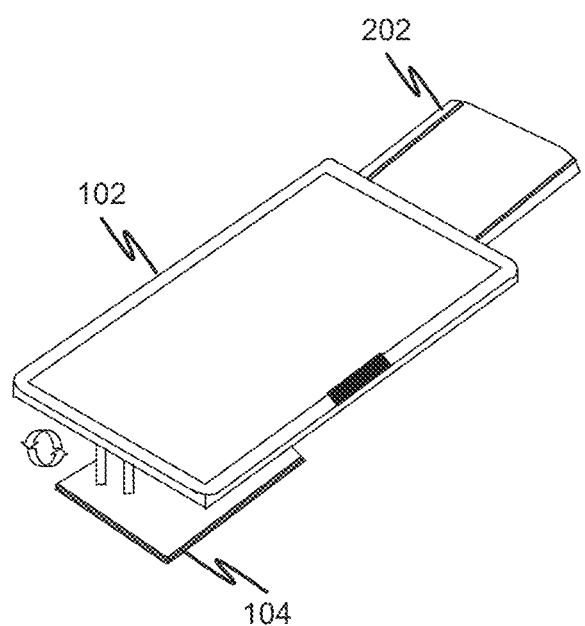
FIG. 2 is a diagram of an example all-in-one computer system showing built-in document feeding and scanning capabilities in accordance with some implementations.
Figure 3:
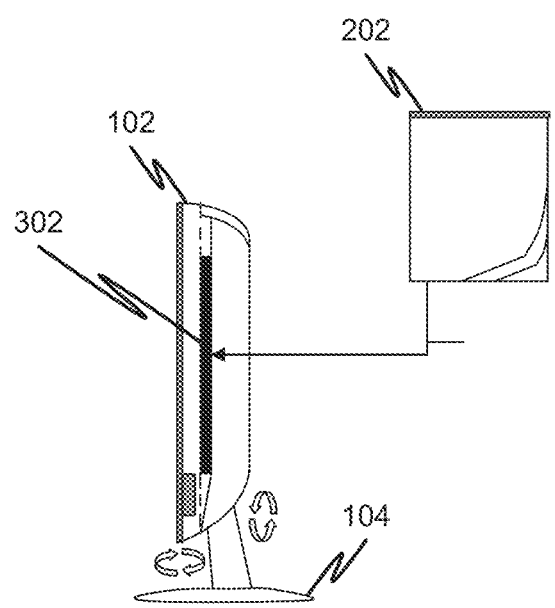
FIG. 3 is a diagram of a side view of an example all-in-one computer system showing built-in document feeding and scanning capabilities in accordance with some implementations.

FIGS. 2 and 3 are diagrams of an example AiO computer system showing built-in document tray 202 feeding and scanning capabilities in accordance with some implementations. The document tray 202 can be used to support documents being fed into a scanner via a slot (302) in the integrated electronics component 102. Some implementations can include a camera or imaging device in place of the scanner. For example, a flexible arm camera can be natively installed or a plug-and-go installation (e.g. USB device). If it is a plug-and-go installation, the CPU must be turned on so that the camera device can be loaded and recognized by the AiO device. Also, the mentioned software application that manages a scan or copy will be automatically launched when the photo of an image is taken.

Figure 4:
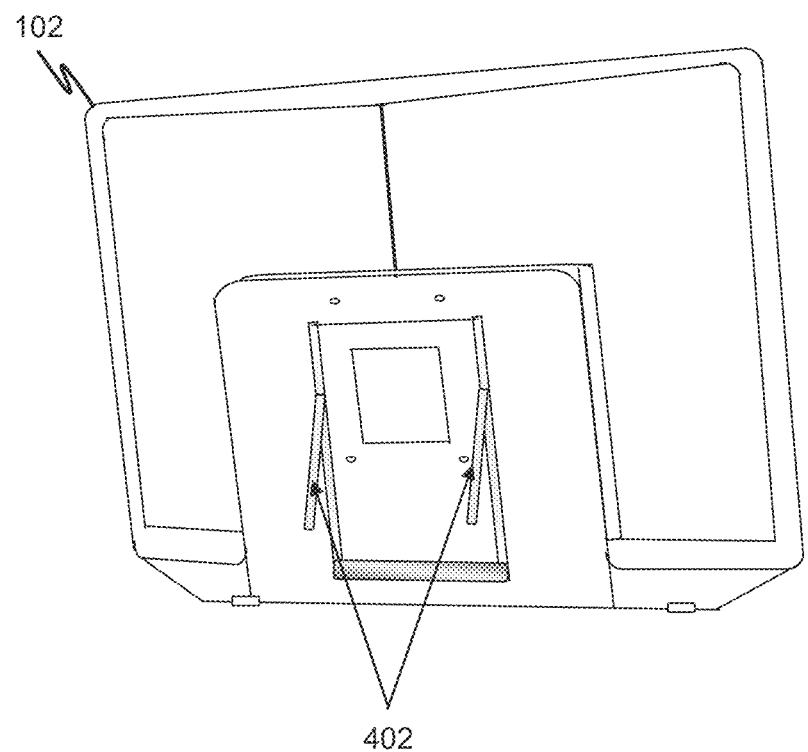
FIG. 4 is a diagram of a rear view of an example all-in-one computer system showing built-in document feeding and scanning capabilities in accordance with some implementations.

FIG. 4 is a diagram of a rear view of an example AiO computer system showing a stand 402 in accordance with some implementations.

Figure 5:
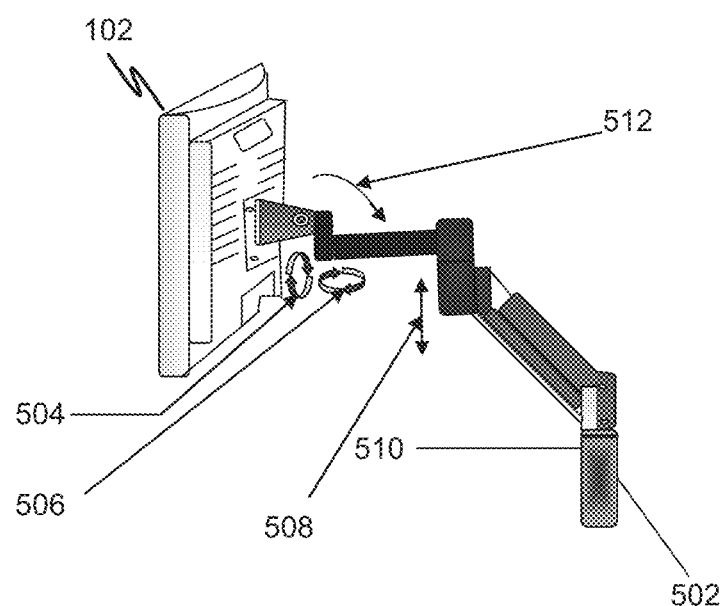
FIG. 5 is a diagram of an example all-in-one computer system showing degrees of motion in accordance with some implementations.

FIG. 5 is a diagram of an example AiO computer system showing degrees of motion in accordance with some implementations. The AiO system in FIG. 5 shows an articulated support arm 502 that permits the AiO system 102 to swivel about a first axis 504, a second axis 506, transition along a third axis 508, rotate about a fourth axis 510, and swivel about a fifth axis 512. The arm(s) coupled between the base of the stand and the computer housing can be capable of supporting the forward or backward movement of the housing in a fluid motion, allowing for positioning on either a vertical or horizontal plane. This is achievable by allowing the back of the housing to be connected to the arm(s) by way of rotating swivel joints. Furthermore, the housing will be capable of adjusting in height due to its ease of movement up and down the arm(s) connected to the stand's base. The aforementioned physical functionality is adaptable to any suitable arm type (i.e. single, double, fixed, retractable, etc.).

The stand and swivel arrangements shown in the figures and described herein are examples for illustration purposes. The swivel capability will be applicable to both arms as opposed to just one. Therefore, the display will pivot horizontally on both arms simultaneously. The arms may also be closely positioned to each other with miniscule separation in between, thereby, having an almost similar effect as if both arms were operating as one. Pivot points will be linked to the computer housing at fixed locations, allowing both arms attached to the computer housing to be pivotable aspects.

Manual swiveling involves the manual locking and unlocking of the swivel mechanism so that the display unit can be moved into position. This can be achieved in a number of ways, one of which is to depress the swivel rod mechanism from its latched position and alter the unit's positioning before it is locked into position again. Mechanical swiveling will be achieved by the pressing of a toggle button on the display device or remote control that possesses arrows indicating the direction of movement when specific sides of the toggle button are pressed.

Figure 6:
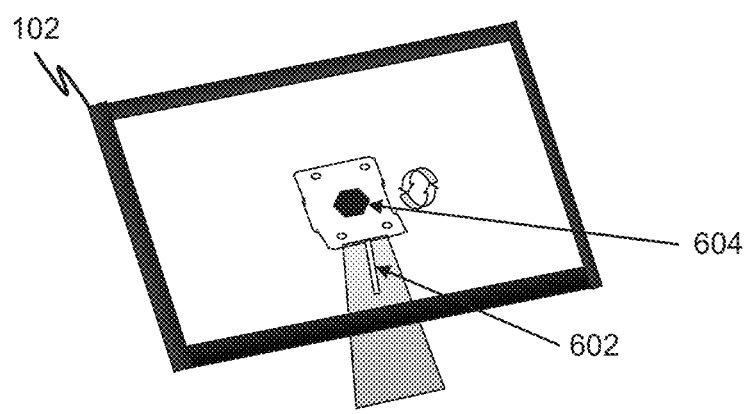
FIG. 6 is a diagram of an example all-in-one computer system showing degrees of motion in accordance with some implementations.

FIG. 6 is a diagram of an example AiO computer system showing a stand 602 having a connection plate 604, where the stand 602 and connection plate 604 provide degrees of motion in accordance with some implementations.

Figure 7:
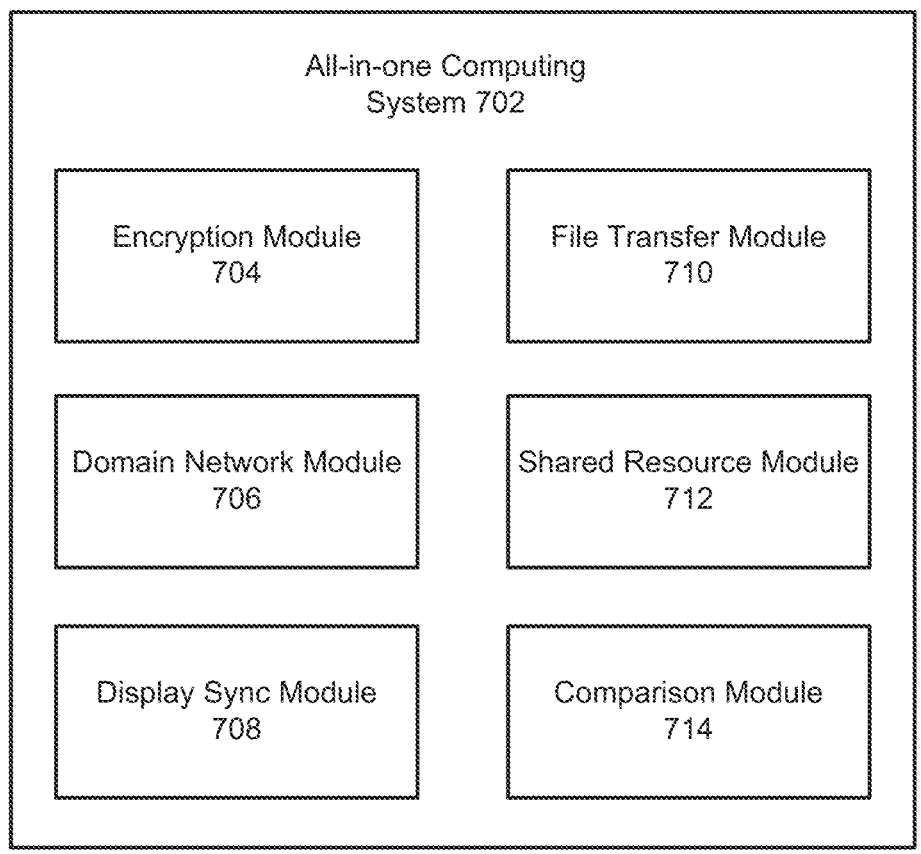
FIG. 7 is a diagram of an example all-in-one computer system showing internal modules in accordance with some implementations.

FIG. 7 is a diagram of an example AiO computer system 702 showing internal modules in accordance with some implementations. The AiO system 702 can include one or more of an encryption module 704, a domain network module 706, a display sync module 708, a file transfer module 710, a shared resource module 712, or a comparison module 714. The functions of the modules (704-714) are described below in connection with FIGS. 9-14.

Figure 8:
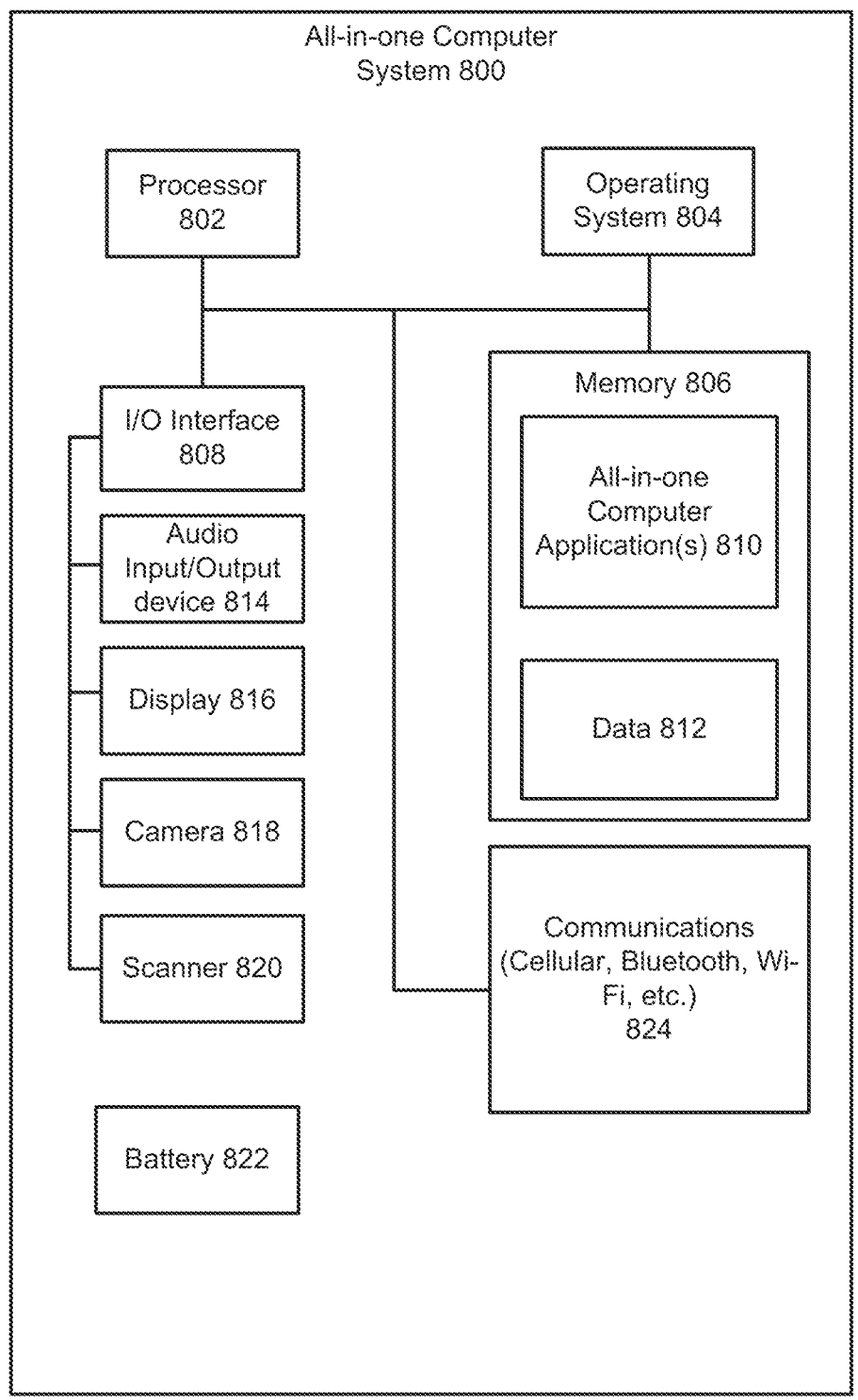
FIG. 8 is a block diagram of an example computing device which may be used for one or more implementations described herein.

FIG. 8 is a block diagram of an example AiO computer system 800 which may be used to implement one or more features described herein. In one example, all-in-one computer device 800 may be used to implement a device as shown in FIGS. 1-7, and perform appropriate method implementations described herein (e.g., one or more of the methods shown in FIGS. 9-14). In some implementations, all-in-one computer device 800 includes a processor 802, an operating system 804, a memory 806, and input/output (I/O) interface 808.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 806 is typically provided in all-in-one computer device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 806 can store software operating on the all-in-one computer device 800 by the processor 802, including an operating system 804, one or more applications 810, and messaging/chat session data 812. In some implementations, applications 810 can include instructions that enable processor 802 to perform the functions described herein, e.g., some or all of the methods of FIGS. 9-14.

For example, applications 810 can include an all-in-one computer application, which as described herein can provide one or more of the all-in-one functions described herein (e.g., one or more of FIG. 7, or 9-14) and other functions, e.g., providing displayed user interfaces responsive to user input to display user-selectable elements. Other applications or engines 814 can also or alternatively be included in applications 810, e.g., email applications, SMS and other phone communication applications, web browser applications, media display applications, communication applications, web hosting engine or application, social networking engine or application, etc. Any of software in memory 804 can alternatively be stored on any other suitable storage location or computer-readable medium. In addition, memory 804 (and/or other connected storage device(s)) can store images, video, and other instructions and data used in the features described herein. Memory 804 and any other type of storage (magnetic disk, optical disk, magnetic tape, or other tangible media) can be considered "storage" or "storage devices."

I/O interface 808 can provide functions to enable interfacing the server device 800 with other systems and devices. For example, network communication devices, storage devices (e.g., memory and/or database), and input/output devices can communicate via interface 808. In some implementations, the I/O interface 808 can connect to interface devices including input devices (keyboard, pointing device, touchscreen, microphone, camera, scanner, etc.) and/or output devices (display device, speaker devices, printer, motor, etc.). Audio input/output device 814 (e.g., microphone and speaker), display device 816 and camera device 818 are examples of input/output devices that may be used to capture input (microphone and/or camera) and to provide output (display and speaker). Display device 816 can be connected to device 800 via local connections (e.g., display bus) and/or via networked connections and can be any suitable display device, some examples of which are described below.

For ease of illustration, FIG. 8 shows one block for each of processor 802, memory 806, I/O interface 808, and software block 810. These blocks may represent one or more processors or processing circuitries, operating systems, memories, I/O interfaces, applications, and/or software modules. In other implementations, all-in-one computer device 800 may not have all of the components shown and/or may have other elements including other types of elements instead of, or in addition to, those shown herein.

A domain network is a computer network managed as a domain, whereby, all user accounts, computers, printers, and other security principals are registered on this private network. Consequently, "same domain network" is a reference to a domain network that can have multiple AiO computers registered. Traditional and current industry practice may require the creation of a domain network to be manually initiated and configured, in addition to other computer devices having to be manually added to the network by accessing the actual device. AiO devices can start and finalize a domain network creation while only asking a few configuration questions throughout the process. An advantage provided by the AiO and method described herein is that other AiO devices merely connected to the internet can automatically be configured and added to such a domain network providing the name of the AiO device, its unique id, and valid administrator access credentials are input when requested. In this instance, the AiO device itself does not have to be accessed for this domain network device join to occur. This will be accomplished by an administrator of the domain's primary AiO device commencing this process. Customized software will then execute to gather relevant data from the previously mentioned administrator about the name of the domain network, the exact AiO devices to add, and a minimal amount of other necessary information.

Figure 9:
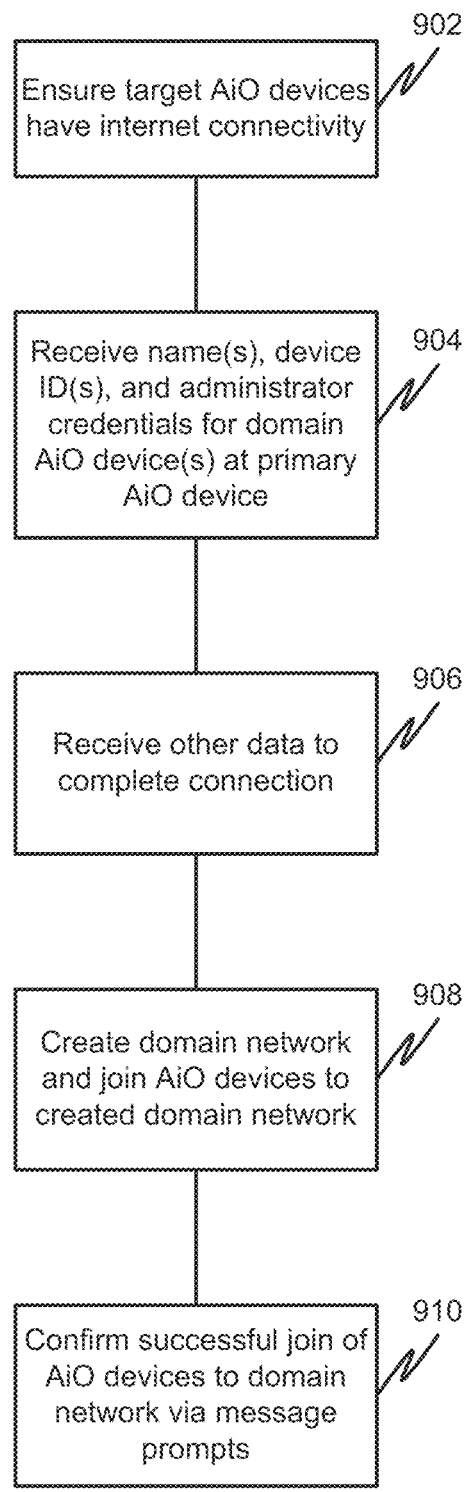
FIG. 9 is a flowchart of an example method for implementation of a domain network in accordance with some implementations.

FIG. 9 is a flowchart of an example method for implementation a domain network in accordance with some implementations. Processing begins at 902, where the system ensures or verifies successful internet connectivity exists on the targeted AiO device(s). Processing continues to 904.

At 904, the name(s), device id(s), and administrator credentials of the AiO device(s) are provided to and received by the primary AiO device (i.e., the AiO device initiating and managing this process) device when prompted. Processing continues to 906.

At 906, other required data and optional selections are provided to and received by the primary AiO to complete configuration. Processing continues to 908.

At 908, the domain network is created and the AiO devices are joined to the network. For example, native software can automate the domain network creation and joining of the AiO device(s) to the newly created network. Processing continues to 910.

At 910, the primary AiO confirms successful domain network creation and joining of the AiO device(s) to the network via message prompt(s).

Figure 10:
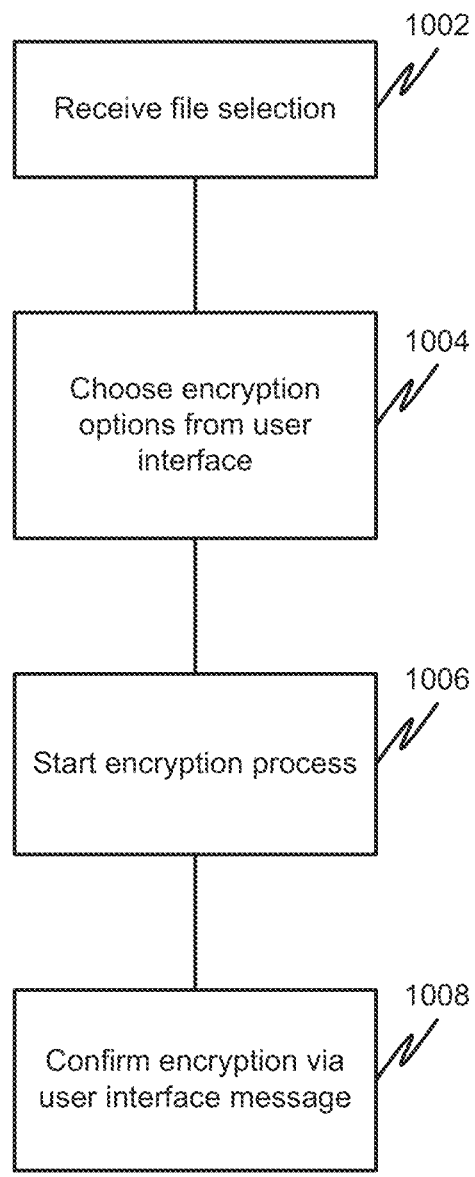
FIG. 10 is a flowchart of an example method for encryption in accordance with some implementations.

FIG. 10 is a flowchart of an example method for encryption in accordance with some implementations. Processing begins at 1002, where file selection is received. Processing continues to 1004.

At 1004, a user is prompted to choose preferred options (e.g. type of encryption algorithm) from an options dialog and the system receives the options selections. Processing continues to 1006.

At 1006, the encryption process is started (e.g., automatically or manually).

Processing continues to 1008.

At 1008, encryption of selected file(s) is confirmed and an indication of confirmation is provided via message prompt(s).

Figure 11:
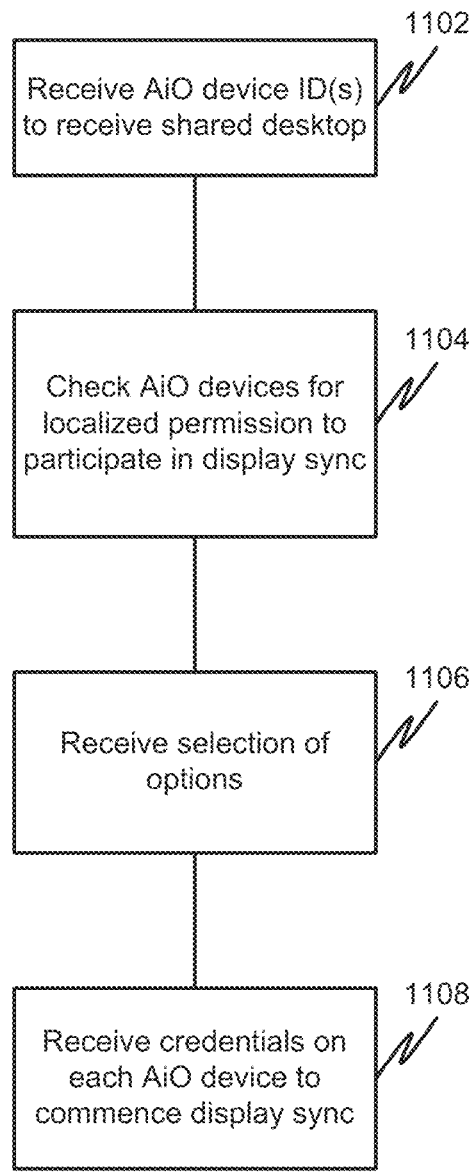
FIG. 11 is a flowchart of an example method for display synchronization in accordance with some implementations.

FIG. 11 is a flowchart of an example method for display synchronization in accordance with some implementations. Processing begins at 1102, where the AiO device id(s) are received that will receive the shared desktop display from the parent (i.e. the AiO device whose desktop display will be shared) AiO device. Processing continues to 1104.

At 1104, AiO devices are checked for localized permission to participate in display sync. For example, a system can automatically check using native software if the AiO device(s) participatory in viewing the shared desktop have localized (i.e. on each device itself) permission to utilize this functionality. Processing continues to 1106.

At 1106, a system receives selection of preferred options (e.g. start and end display time; no time constraints; permission to grant remote access control of the shared desktop) from the options dialog. Processing continues to 1108.

At 1108, the system receives valid credentials from each AiO device (e.g., by way of a dialog prompt to commence desktop display sharing) and display sync commences.

Figure 12:
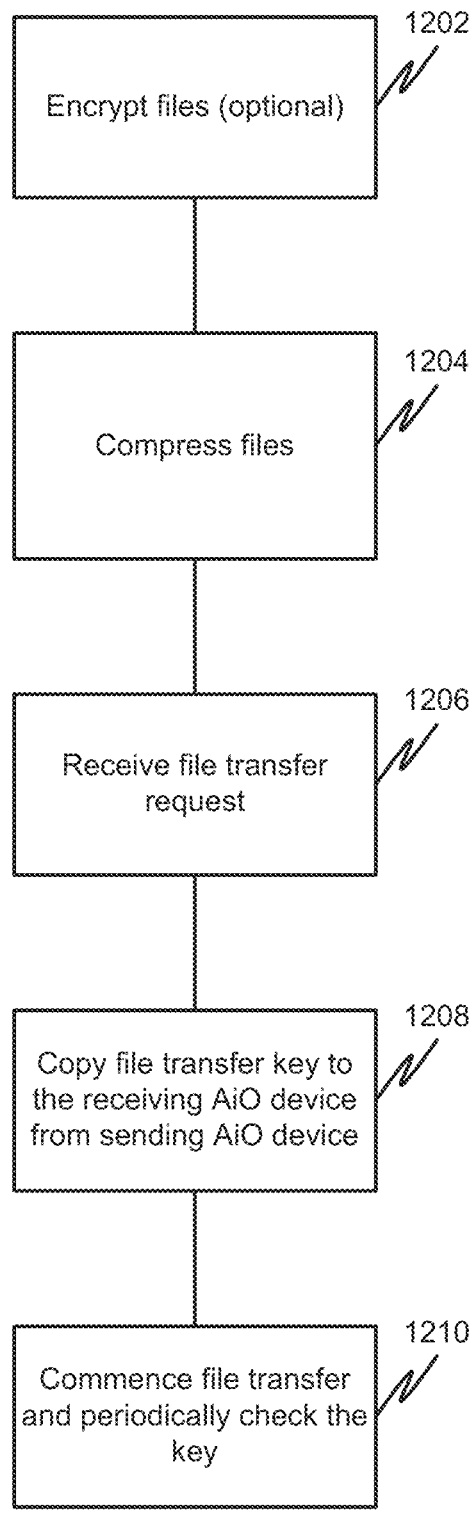
FIG. 12 is a flowchart of an example method of file transfer in accordance with some implementations.

FIG. 12 is a flowchart of an example method of file transfer in accordance with some implementations. Processing begins at 1202, where files to be transferred are optionally encrypted. Processing continues to 1204.

At 1204, the files to be transferred are compressed. Processing continues to 1206.

At 1206, a file transfer request is received. Processing continues to 1208.

At 1208, a file transfer key is copied from the sending AiO device to the receiving AiO device. For example, the file transfer key can include a unique file transfer key that is programmatically generated by the AiO device file transfer protocol before any file transfer commences. This key comprises the joining of the current system date, the forwarding and receiving device ids, and a random pattern of characters. Before each file transfer occurs, each key is stored in an encrypted system file on the forwarding and receiving AiO device located in a hidden and inaccessible system directory. The last recorded key stored on the participating devices is checked before each file transfer so that a newly created key does not duplicate a pre-existing key. The aforementioned system file is backed up locally (i.e. on each device itself) and refreshed each day. Processing continues to 1210.

At 1210, file transfer is commenced and the file transfer key is periodically verified on both sender and receiver AiO systems.

Figure 13:
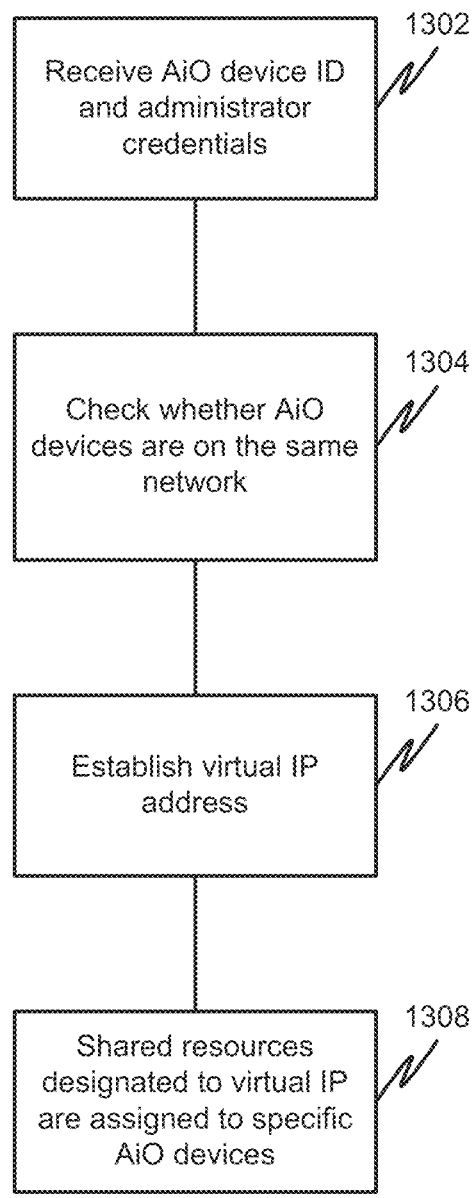
FIG. 13 is a flowchart of an example method of resource sharing in accordance with some implementations.

FIG. 13 is a flowchart of an example method of resource sharing in accordance with some implementations. Processing begins at 1302, where the system receives the AiO device id and administrator credentials involved in this process when prompted. Processing continues to 1304.

At 1304, the system checks whether the AiO devices are on the same network. For example, the system can automatically check using native software if all AiO devices contributing resources to the pool are on the same network. A virtual network is established if this is false. Processing continues to 1306.

At 1306, a virtual IP address is established so that the pool of resources can reside and be accessed from a specific network location. Processing continues to 1308.

At 1308, the resources designated to the virtual IP address are assigned proportionately to specific AiO devices and the resources are shared accordingly.

Figure 14:
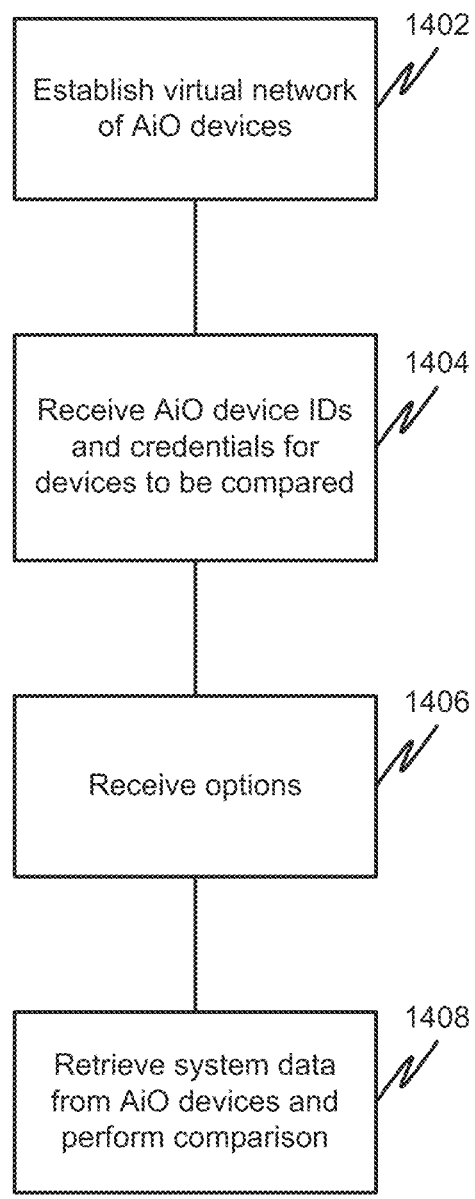
FIG. 14 is a flowchart of an example method of system comparison in accordance with some implementations.

FIG. 14 is a flowchart of an example method of AiO system comparison in accordance with some implementations. Processing begins at 1402, where a virtual network is established between the AiO devices in the absence of an established domain network. Processing continues to 1404.

At 1404, the devices IDs and administrator credentials for each AiO are requested for input, and received. Processing continues to 1406.

At 1406, options for system data output are received. Processing continues to 1408.

At 1408, the system data regarding each AiO device is retrieved from the system information log and a comparison can be performed. This system data can be hardware or software related. The data can be aggregated and output in a single file format of choice or looked at from a comparative analysis perspective. This allows specific system values to be highlighted and compared which can also be saved in a preferred file format. In some implementations, to compare the systems of two or more AiO devices, the sync application can also be used to perform the comparison.

In some implementations, an AiO device can include dual power buttons, a monitor power button and a CPU power button, for example. The monitor power button turns on the monitor which allows the device to be used solely as a display. The CPU power button turns on both the monitor and CPU, allowing the device to be used as a computer. Activating either power button renders the scanner/copier operational (i.e. operational mode).

To perform a scan, the scanner/copier is placed into operational mode. When in this mode, if the device is being used as a display, the scanned document can be displayed on the monitor. However, the document is unable to be saved to the computer's hard disk as the CPU is off. Enabling the device's wireless internet connectivity (WiFi) ensures documents can be scanned and saved to a myriad of other computing devices when the WiFi is connected to a network.

Copying documents also requires the scanner/copier to be in operational mode, however, a printer must be attached to the device by wire or wirelessly. The printer's configuration to the device is checked before a copy is processed.

The scanner/copier can include positional sensors. If the scanner/copier is not in operational mode and the monitor is swiveled to a horizontal (flatbed stance with its face up) position, the positional sensors receive this input and the monitor is turned on. This action puts the scanner/copier in operational mode. If the CPU is on and the monitor is swiveled horizontally, the software application that manages a scan or copy is automatically launched.

Additionally, touch sensors located at an optimum depth in the entrance of the scanner/copier activates the operational mode if a document is inserted at that depth. Either the monitor is turned on if it is off or the scan/copy software application is automatically launched if the CPU is on. This functionality pertaining to the touch sensors is experienced regardless of the monitor being in a vertical or horizontal position.

Finally, when the monitor is in a vertical position, only the touch sensors when activated allow automated behavior. Otherwise, such defaulted actions are disabled and the user has sole control of the scanning/copying process. The swiveling capability of an AiO device can be both manually and mechanically (via installed software and toggle buttons) controlled.

One or more methods described herein can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, image processing and/or machine vision arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for an all-in-one computer and associated methods.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A system comprising:
a processor coupled to a computer readable storage device housed within an enclosure;
a display coupled to the processor and housed within the enclosure;
a scanner/copier coupled to the processor and housed within the enclosure;
a base coupled to the enclosure, wherein the base is configured to permit the enclosure to rotate about a first axis and swivel about a second axis, wherein the first axis is on a first plane and the second axis is on a second plane that is different from the first plane;
verifying successful internet connectivity exists on one or more AiO devices, wherein the AiO devices are all-in-one computing devices that execute more than one function;
receiving, at a first AiO device, a name, a device id, and administrator credentials for each of the one or more AiO devices;
receiving, at the first AiO device, configuration completion information;
creating, at the first AiO device, a domain network of the first AiO device and the one or more AiO devices; and
joining the one or more AiO devices to the domain network.

2. The system of claim 1, wherein the enclosure includes a first opening to feed documents into the scanner/copier and a second opening to eject the documents from the scanner/copier, wherein the first opening is different from the second opening.

3. The system of claim 1, further comprising a remote control configured to communicate with the processor, wherein communications from the remote control to the processor can include one of a first communication to initiate a boot sequence and a second communication to initiate a shutdown of the system, wherein the communications from the remote control includes a radio frequency signal.

4. The system of claim 1, wherein the computer readable storage has software instructions stored therein that, when executed by the processor, cause the processor to perform operations including:
encrypting one or more files to be transferred;
compressing the encrypted one or more files to be transferred;
receiving a file transfer request;
copying a file transfer key from a sending AiO device to a receiving AiO device, wherein the receiving AiO device and the sending AiO device are all-in-one computing devices that execute more than one function;
initiating file transfer; and
periodically verifying the file transfer key on both the sending AiO device and the receiving AiO device.

5. The system of claim 1, wherein the computer readable storage has software instructions stored therein that, when executed by the processor, cause the processor to perform operations including:
receiving a device id and administrator credentials for one or more AiO devices, wherein the AiO devices are all-in-one computing devices that execute more than one function;
checking whether the one or more AiO devices are on a same network;
when the one or more AiO devices are not on the same network, establishing a virtual network of the one or more AiO devices;
establishing a virtual IP address to permit a pool of shared resources to reside on the one or more AiO devices and be accessed from a specific network location; and
assigning the pool of shared resources associated with the virtual IP address proportionately to specific ones of the one or more AiO devices and permitting the pool of shared resources to be shared among the one or more AiO devices.

6. The system of claim 1, wherein the computer readable storage has software instructions stored therein that, when executed by the processor, cause the processor to perform operations including:
establishing a virtual network is established between one or more AiO devices wherein the AiO devices are all-in-one computing devices that execute more than one function;
requesting a device ID and administrator credentials for the one or more AiO devices;
receiving options for system data output;
retrieving system data for the one or more AiO devices from respective system information logs; and
comparing the system data from the one or more AiO devices to generate an AiO device comparison.

7. The system of claim 1, wherein the base is further configured to permit the enclosure to move along a third axis, wherein the third axis is on a third plane that is different from the first plane and the second plane.

8. A system comprising:
a processor coupled to a computer readable storage device housed within an enclosure;
a display coupled to the processor and housed within the enclosure;
a scanner/copier coupled to the processor and housed within the enclosure;
a base coupled to the enclosure, wherein the base is configured to permit the enclosure to rotate about a first axis and swivel about a second axis, wherein the first axis is on a first plane and the second axis is on a second plane that is different from the first plane, wherein the enclosure includes a first opening to feed documents into the scanner/copier and a second opening to eject the documents from the scanner/copier, wherein the first opening is different from the second opening;
a monitor power button; and
a CPU power button, wherein the monitor power button turns on a monitor and permits the system to be used solely as a display, wherein the CPU power button turns on both the monitor and a CPU, allowing the system to be used as a computer, wherein activating either power button puts the scanner/copier into an operational mode, wherein, when the scanner/copier is in operational mode, when the system is being used as a monitor only, a scanned document is displayed on the monitor, and when a wireless network connection is enabled, scanned documents are permitted to be saved to an external system via the wireless network connection.

9. The system of claim 8, wherein the scanner/copier includes one or more positional sensors, wherein when the scanner/copier is not in operational mode and the monitor is swiveled to a horizontal position, the positional sensors receive this input and the monitor is turned on, which puts the scanner/copier in operational mode, and wherein, when the CPU is on and the monitor is swiveled horizontally, a software application to manage a scan or copy is automatically launched.

10. The system of claim 9, further comprising one or more document sensors located at a given depth inside the first opening of the scanner/copier to activate the operational mode of the scanner/copier when a document is inserted at the given depth, wherein the monitor is turned on if the monitor was off or a scan/copy software application is automatically launched if the CPU is on, and wherein document sensor operation is enabled when the monitor is in a vertical or horizontal position.

11. The system of claim 10, wherein when the monitor is in a vertical position, only the one or more document sensors, when activated, allow automated behavior, otherwise default actions are disabled and a user has sole control of a scanning/copying process, and wherein swiveling capability of an AiO device can be both manually and mechanically controlled, via installed software and toggle buttons, wherein the AiO device is an all-in-one computing device that executes more than one function.

12. The system of claim 8, further comprising a remote control configured to communicate with the processor, wherein communications from the remote control to the processor can include one of a first communication to initiate a boot sequence and a second communication to initiate a shutdown of the system, wherein the communications from the remote control includes a radio frequency signal.

13. The system of claim 8, wherein the base is further configured to permit the enclosure to move along a third axis, wherein the third axis is on a third plane that is different from the first plane and the second plane.

14. A system comprising:
a processor coupled to a computer readable storage device housed within an enclosure;
a display coupled to the processor and housed within the enclosure;
a scanner/copier coupled to the processor and housed within the enclosure; and
a base coupled to the enclosure, wherein the base is configured to permit the enclosure to rotate about a first axis and swivel about a second axis, wherein the first axis is on a first plane and the second axis is on a second plane that is different from the first plane, wherein the computer readable storage has software instructions stored therein that, when executed by the processor, cause the processor to perform operations including:
receiving, at one or more AiO devices, one or more AiO device identifiers corresponding to the one or more AiO devices to receive a shared desktop display from a parent AiO device in a display synchronization operation, wherein the AiO devices are all-in-one computing devices that execute more than one function;
checking the one or more AiO devices for localized permission to participate in the display synchronization operation;
receiving, at the parent AiO device, selection of options;
receiving valid credentials from the one or more AiO devices; and
initiating display synchronization among the one or more AiO devices.

15. The system of claim 14, wherein the enclosure includes a first opening to feed documents into the scanner/copier and a second opening to eject the documents from the scanner/copier, wherein the first opening is different from the second opening.

16. The system of claim 14, further comprising a remote control configured to communicate with the processor, wherein communications from the remote control to the processor can include one of a first communication to initiate a boot sequence and a second communication to initiate a shutdown of the system, wherein the communications from the remote control includes a radio frequency signal.

17. The system of claim 14, wherein the base is further configured to permit the enclosure to move along a third axis, wherein the third axis is on a third plane that is different from the first plane and the second plane.

* * * * *